Sept. 13, 1960 F. W. MILLER 2,952,133
DISPOSABLE FROSTED VESSEL
Filed June 3, 1958

INVENTOR
FREDERICK W. MILLER
BY
Walter G. Finch
ATTORNEY

United States Patent Office 2,952,133
Patented Sept. 13, 1960

2,952,133
DISPOSABLE FROSTED VESSEL
Frederick W. Miller, 5846 Bellona Ave., Baltimore 12, Md.
Filed June 3, 1958, Ser. No. 739,511
2 Claims. (Cl. 62—1)

This invention relates generally to special receptacles, and more particularly it pertains to a disposable frosted vessel.

In the serving of cold beverages, considerable effort is often entailed in pre-cooling the container. To properly serve, for example, a mint julep, the glasses are chilled for hours and exposed to a humid atmosphere to frost. Then after the glass is emptied a second serving requires a newly pre-cooled glass with the trouble and bother of washing and sterilizing the used ones.

Many beverages could not previously be dispensed by vending machines because of the container problem. A disposable glass is expensive and unsafe from a breakage standpoint. Children regret to down the last drop of a beverage and often hopefully wait for the melting of ice cubes to extend the final quantity of drink. Everyone knows the value of a drink of pure ice water after partaking of a somewhat sticky or sweet beverage.

It is, therefore, an object of this invention to provide a vessel for beverages and the like which is cold, cooling, edible, and can be colored and flavored.

Further objects of this invention are to provide a drinking vessel which is self-frosting; which can be molded with shapes and characters; which can have embedded or cast-in articles; which is not hand-chilling; and which is sanitary, drip-free and individual.

Still another object of this invention is to provide a safe, economical cup of readily available material and which can be made and handled as a disposable item.

Another object of this invention is to provide a cooling cup for dispensing beverages from vending machines and the like.

And yet another object of this invention is to provide a drinking vessel which cools and dilutes a beverage in a self-replenishing manner.

Another object of this invention is to provide an ice cup holder.

Still another object of this invention is to provide an efficient beverage cooling container which will not dilute the contents.

Figure 1:
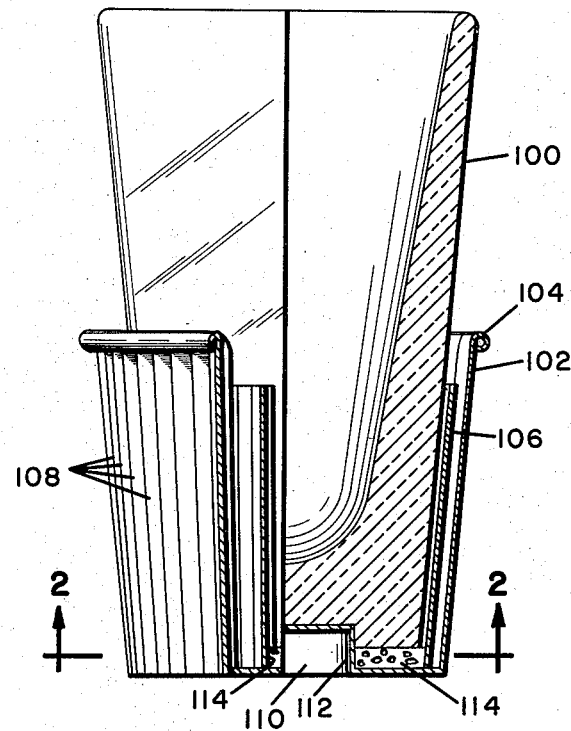
Figure 2:
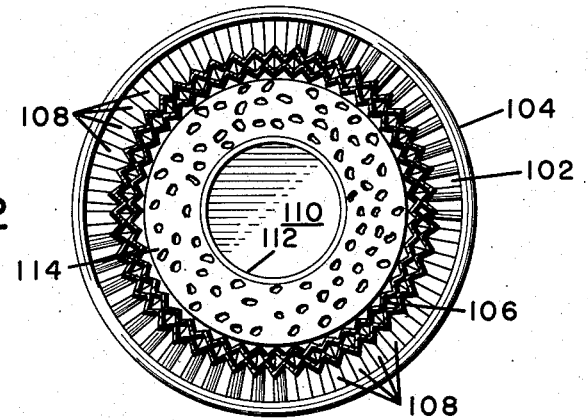

These and other objects and advantages of the invention will become more readily apparent and understood from the accompanying specification and drawings in which:

Fig. 1 is a side elevation partly in quarter section, of a drinking vessel incorporating the features of this invention; and Fig. 2 is a cross-section of the drinking vessel taken along line 2—2 of Fig. 1.

Referring now to Figs. 1 and 2 of the drawings, there is shown a hollow vessel 100. Vessel 100 is of frusto-conical shape and is made of a frozen edible liquid, such as water, which may be pure colored and/or flavored. Vessel 100 has a cross-section as shown in Fig. 1, tapering from relatively thin wall thickness at the top of the side wall to a greater wall thickness near the base thereof. The base of vessel 100 has a centrally located recessed portion 110 cast therein.

Surrounding the lower side of vessel 100, is an inner bottomless corrugated liner 106 which may be of paper or some absorbent material.

An outer corrugated cup 102, which may be of waterproof paper or metal foil, has a rolled lip 104 and a centered re-entrantly extending walled recess 112.

An annular disk 114 of sponge-like or absorbent material is contained in the bottom of cup 102, and the whole cup assembly is fitted around the bottom of vessel 100 and the inner liner 106.

It can be seen that recess 110, together with walled recess 112, serves to axially align vessel 100 and outer cup 102. A plurality of longitudinally extending spaces are created around the lower side of vessel 100 by the corrugations 108 of outer cup 102 as well as those of inner liner 106.

These spaces perform the dual function of insulating the ice vessel 100 from the heat of the holder's hand as well as to serve as passages for any melted ice which is funneled downward by outwardly rolled lip 104. The absorbent washer 114 is provided to retain this moisture in the bottom of cup 102.

The melting point of a substance or material is, in general, affected by pressure. It is for this reason that the wall of vessel 100 has the tapering construction previously stated. Here the thickness gradient is in proportion to the depth and, therefore, the pressure of the contained liquid. A uniform internal wall erosion of vessel 100 is thereby attained.

It has been found that the build-up of frost in a regenerative manner prolongs the life of the present vessel depending upon the nature of the contents. While certain soft drinks yield a vessel life of thirty or more minutes, alcoholic beverages probably because of their strong lowering-of-freezing point properties, result in an hour-and-a-half to five hour vessel life. The latter figure results from several refills of the contents.

As mentioned in the objects, articles may be frozen into the vessel. Small sprigs or leaves or bits of fruit make a decorative and edible border or design. It is submitted that small souvenirs or prizes for children may also be cast into the vessel wall and retrieved after the liquid contents are consumed.

The cast-in article may be in the nature of a reenforcing structure if desired. To prevent spillage from accidental breakage or perforation of the vessel 100 a portion or all of the cast-in reinforcing structure may be water-tight.

These embedded articles may carry advertising slogans or the like or the message may be cast-in raised or depressed characters in the wall material of vessel 100 itself.

Obviously many other modifications and variations of the present invention are possible in the light of the above teachings. It is, therefore, to be understood that within the scope of the appended claims the invention may be practiced otherwise than as specifically described.

What is claimed is:

1. A frozen drinking vessel arrangement, comprising, structure defining a frustro-shaped, hollow body opened at its upper end and closed at its lower base end and formed of edible material, said body having a wall thickness increasing from its upper end to its lower end in proportion to the pressure exerted by the height gradient of said body and contents therein, said body also having a recess formed in said lower base end, a receptacle encompassing the lowermost portion of said body and spaced therefrom and having a base with an upwardly extending portion arranged co-axially with said recess in said body to engage and center said body in said receptacle, a plurality of longitudinally extending corrugations in said receptacle for thermally isolating said lower portion of said body from environmental conditions, a liner positioned intermediate said receptacle and wall of said body and spaced from each to form a plurality of longitudinally extending passages for channeling and absorbing moisture, said receptacle being provided with an annularly, divergently extending lip for funneling moisture between said liner and receptacle.

2. An arrangement as recited in claim 1, and means positioned between the base of said receptacle and base of said body for retaining moisture in the bottom of said receptacle.

References Cited in the file of this patent

UNITED STATES PATENTS

| | | |
|---|---|---|
| 1,123,537 | Huizer | Jan. 5, 1915 |

FOREIGN PATENTS

| | | |
|---|---|---|
| 542,373 | France | May 16, 1922 |